Patented Dec. 11, 1951

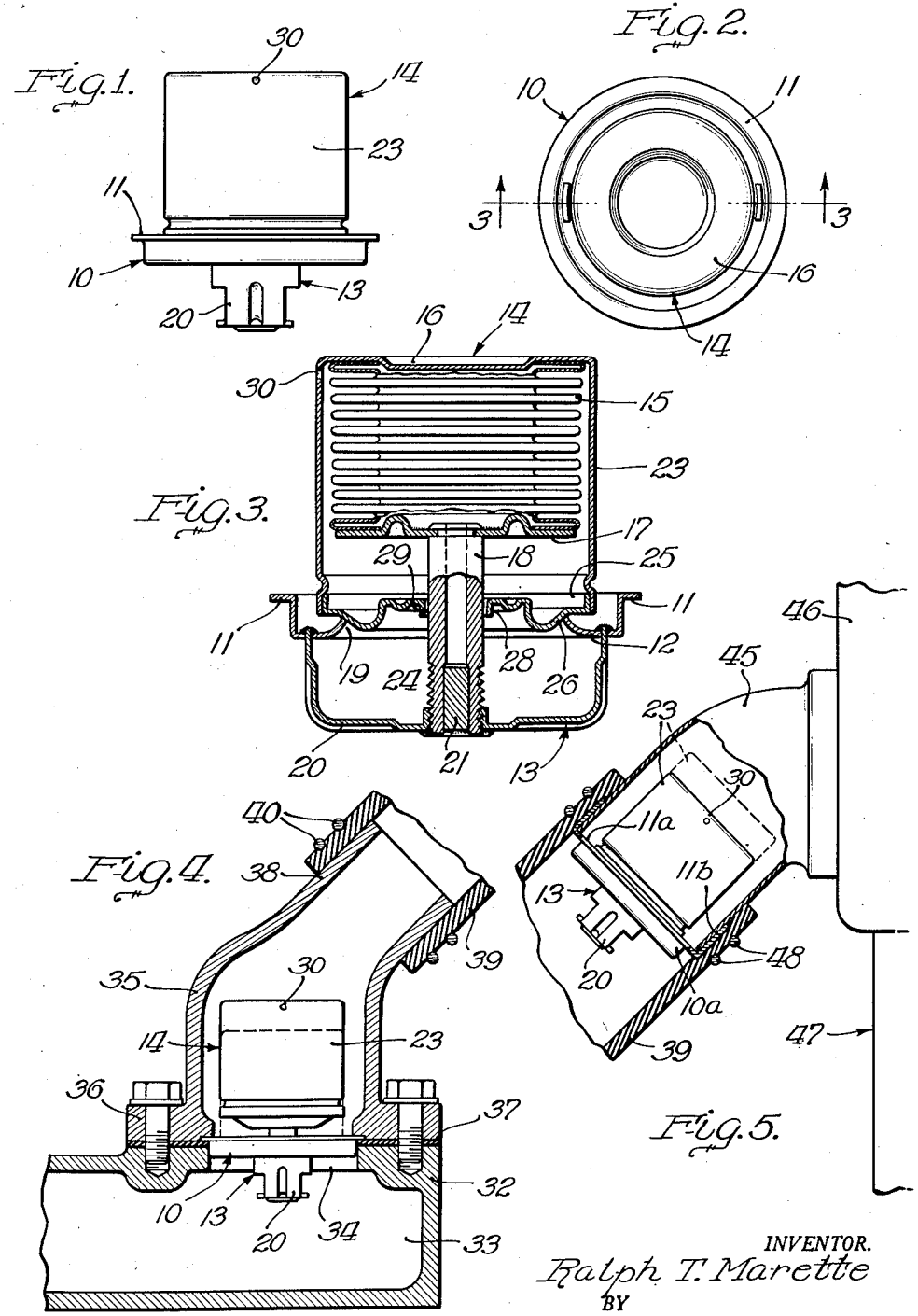

2,578,141

UNITED STATES PATENT OFFICE 2,578,141

THERMOSTAT CONTROL MEANS FOR
ENGINE COOLING SYSTEMS

Ralph T. Marette, Cleveland Heights, Ohio, assignor to The Bishop & Babcock Manufacturing Company, Cleveland, Ohio, a corporation of Ohio Application November 19, 1949, Serial No. 128,381

6 Claims. (Cl. 236—34)

This invention relates to cooling systems for internal combustion engines, and has to do with such systems embodying thermostat means for controlling flow of the cooling water.

In engine cooling systems commonly used the cooling water is withdrawn from the bottom or lower tank of the radiator and is propelled, by a suitable pump, through the water spaces of the engine block and thence, through an outlet fitting and a length of hose, to the upper tank of the radiator. It is known to provide such systems with thermostat valves to retard or prevent return of the cooling water to the radiator until the water in the engine block has been heated to a predetermined temperature—usually around 150° F.—to guard against undue cooling of the engine after starting thereof. The known thermostat valves presently used for that purpose comprise a valve seat member, a cooperating valve member at one side of the seat member, and a bellows thermostat at the other side of the seat member having a movable head adjacent thereto and attached to the valve member for moving it to and from the seat member, the thermostat also having a fixed head remote from the seat member, which seat member is provided with an outwardly extending circumferential flange. It is usual, where the depth of the cooling water space of the engine block top, or cylinder head, permits, to clamp the flange of the valve seat member between the engine block and the water outlet fitting, with the bellows extending into the engine block cooling water space. It frequently happens that the bellows when so disposed is in such close proximity to the wall of the engine block as to be unduly heated, or subjected to what is termed "hot spots," thereby. Under such conditions the bellows responds to the heat of the engine block rather than to the temperature of the cooling water, which renders it uncertain and unsatisfactory in operation. In some cases, the water space of the engine block top, or the cylinder head, is so shallow that the thermostat bellows can not be inserted therein. That necessitates the use of a special adaptor between the engine block and the water outlet fitting, which adds materially to the cost of installation of the thermostat valve. While it usually is preferred to mount the thermostat valve in proximity to the engine block, as above, in some cases that valve is mounted in the radiator hose in proximity to the radiator water inlet fitting or elbow. In each of the several presently known uses of thermostat valves above mentioned, the valve member is at the outer side of the valve seat member and opens outward, i. e., in the direction of flow to the radiator of the cooling water. That is objectionable because, in the opening movement of the valve member, the movable head of the bellows thermostat moves toward the valve seat member and may seriously retard flow of water therethrough when the valve member is in full open position, thus largely defeating the purpose of opening the valve member and preventing free flow of water through the cooling system. In that connection, the presently known and used thermostat valves referred to are intended for use in restricted spaces and the thermostat bellows, particularly the movable head thereof, frequently is spaced but a short distance from the valve seat member, when the valve member is in its fully seated or closed position.

My invention is directed to an engine cooling system and thermostat control means therefor which avoid the above noted objections to the presently known and used systems and controls referred to. To that end, I provide a cooling system having a thermostat control valve in which the valve member and the thermostat bellows are both disposed at the same side—the seat side—of the valve seat member. That renders it possible to mount the valve assembly in the water outlet fitting, with the thermostat bellows directed away from the engine block. By so disposing the thermostat bellows, the valve seat member may be clamped between the engine block and the water outlet fitting. That avoids any difficulties in respect to hot spots and the necessity of providing an adaptor when the water space in the engine head is shallow. More particularly, in the thermostat valve of my instant invention, the inner head of the bellows is anchored to the valve seat member and is spaced a substantial distance therefrom, by a stem passing through the passage defined by the valve seat member and of small diameter relative to such passage. The outer head of the bellows is the movable head and the valve member is connected to such outer head for movement thereby toward and away from the seat member. Accordingly, in the movement of the valve member in opening direction there is no movement of the inner head of the bellows toward the seat member, which is conducive to free circulation of the cooling water when the valve member is open. More particularly the valve member is mounted at the inner end of a housing attached to the outer head of the bellows and extending therefrom inward about the bellows. Clearance is provided between the valve member and the stem whereby water may enter the housing from the engine block, and the housing is provided with a restricted opening preferably, though not necessarily, adjacent its outer end. That permits flow of heated water from the engine block into the housing about the bellows. In that manner the bellows is surrounded by heated water and thereby guarded against chilling by the colder water in the outlet fitting, so that the bellows responds to the temperature of the heated water from the engine block, which is conducive to accuracy. The bellows, formed of metal, usually brass, possesses appreciable resiliency and functions, in the assembly, as a tension spring effective for holding the valve member seated, when the water in the engine block is at or below a predetermined low temperature at which the bellows is contracted. The thermostat valve of my invention may also be applied to the water inlet fitting or elbow of the radiator, with the advantages above mentioned in respect to accuracy of operation, and free flow of the cooling water, when the valve is open. A further advantage of the thermostat valve of my invention is that it lends itself to exceptionally close balancing of the valve member against pump pressure. Further objects and advantages of my invention will appear from the detail description.

In the drawings:

Figure 1 is a side view of a thermostat valve assembly embodying my invention, with the valve member thereof in closed position;

Figure 2 is a plan view of the valve assembly of Figure 1;

Figure 3 is a sectional view, on an enlarged scale, taken substantially on line 3—3 of Figure 2;

Figure 4 is a fragmentary sectional view of the top or head of an internal combustion engine block and the water outlet fitting and hose associated therewith, illustrating the cooling system and the thermostat valve assembly of my invention, the valve assembly being shown in elevation with the parts thereof shown in solid lines in the positions they occupy when the valve member is in fully opened position and in dotted lines in the positions they occupy when the valve member is fully closed; and Figure 5 is a fragmentary view partly in section and partly in elevation of a radiator and an associated inlet hose therefor, showing a modified form of thermostat valve assembly embodying my invention in position in the radiator water inlet fitting or elbow, the valve assembly being shown in major portion in elevation with the parts thereof shown in solid lines in the positions they occupy when the valve member is fully closed and in dotted lines in the positions they occupy when the valve member is fully opened.

The valve assembly of my invention comprises an annular valve seat member 10 provided with an outwardly extending circumferential flange 11 at its upper edge. The member 10 has its inner portion turned upwardly to provide a valve seat element 12 which defines a circular passage and is suitably faced at its upper edge to provide a valve seat. A substantially U-shaped frame 13 is secured to seat member 10 and extends downwardly therefrom with its bight portion bridging the passage defined by element 12.

A thermostat bellows 14 is disposed above the seat member 10. The bellows 14 comprises a body 15 formed of suitably corrugated metal, and upper and lower heads 16 and 17, respectively, to which the ends of body 15 are appropriately secured, conveniently by soldering. A tubular stem 18 is secured to head 17 and extends therefrom downward through passage 19 defined by element 12 of seat member 10. The stem 18 is of small diameter relative to passage 19, as will be clear from Figure 2, and is disposed centrally thereof. The lower end portion of stem 18 is exteriorly threaded and screws into the bight element 20 of the bracket or frame 13, the latter being suitably formed and bored and tapped to that end. The bellows 14 receives a suitable charge of a thermosensitive fluid, after which the tubular stem 18 is closed by a sealing plug 21 suitably secured therein. Thermostat bellows of this type are well known and further description thereof is not required here.

A cylindrical housing 23 extends from head 16 downwardly about the body 15 of bellows 14, this housing 23 conveniently being formed integrally with head 16, though it may be secured to the latter in any suitable manner. A valve member 24 is secured in the lower end of housing 23. Member 24 conveniently is provided with an upwardly extending circumferential flange 25 fitting snugly in the lower end of housing 23 and soldered or otherwise suitably secured therein. Member 24 is suitably formed to provide a downwardly and inwardly rounded or inclined element 26 which, in the closed position of valve member 25, seats on the seating surface of element 12 of the valve seat member 10. As is shown more clearly in Figure 2, valve member 24 is provided with a downwardly directed nipple 28 extending about stem 18 and spaced therefrom to provide clearance 29 thereabout opening into the housing 23. The latter is provided, preferably adjacent its upper end, with a restricted opening 30, about one-sixteenth of an inch in diameter. The housing 23 is closed except for the clearance 29 and the opening 30.

In Figure 4 I have shown the thermostat assembly of my invention as embodied in the cooling system of an internal combustion engine, the latter being indicated by the top or cylinder head 32 of an engine block, this head 32 being provided with an interior cooling water space 33. The cylinder head 32 is further provided with the usual outlet opening 34 to a water outlet fitting 35, usually in the form of a casting. The fitting 35 is shaped as shown and is provided with a base bolting flange 36 by means of which it is bolted to head 32, with an intervening gasket 37, in position overlying the opening 34. The fitting 35 is provided, at its upper portion, with a reduced neck 38 adapted for reception of one end of a hose 39 leading to the inlet fitting or elbow of the radiator, as is known, hose 39 being secured about neck 38 by a known type of clamp 40.

With the thermostat valve assembly mounted as in Figure 4, the water in the cooling system, when the valve member 24 is open, flows under pressure from the pump through the water spaces of the motor block, including the head 32, and thence through opening 34 and passage 19 of the valve assembly to the fitting 35 and from the latter through hose 39 to the radiator, in the usual manner. The thermostat is so adjusted that at the predetermined low temperature the valve member 24 is held seated, the body 15 of the bellows functioning as a tension spring as above, for resisting opening of valve member 24 by pump pressure. Preferably, the thermostat is so adjusted that the valve member 24 will start to open at from 158 to 163 degrees F. and will be fully opened at 185° F. and over. In starting the engine with the valve member 24 closed, the water in the water spaces of the engine block is not circulated to any appreciable extent, so that this water is quickly heated in starting of the engine, which facilitates setting the engine into operation. Once the engine has been started and is operating smoothly, continued operation thereof soon heats the water within the engine block water spaces to a temperature at which the valve member 24 starts to open. In that connection, it is to be particularly noted that, as soon as the engine is set into operation, water from the engine block flows through clearance 29 about valve stem 18 into housing 23 and through the restricted seepage opening 30 into the water outlet fitting 35. In that manner, the bellows body 15 is surrounded by heated water from the engine block, which effectively guards the bellows thermostat against chilling by the colder water within fitting 35. Since, as noted, the body of the bellows thermostat is surrounded by water flowing from the engine block, the thermostat is responsive to the temperature of the water entering the housing 23 from the engine block and, for practical purposes, of the same temperature as the water in the spaces of the engine block. When the engine has been operated a short time, the water entering housing 23 from the engine block is at a temperature above the predetermined minimum, thereby causing expansion of the bellows thermostat with resultant movement of the outer head 16 thereof away from the valve seat member 10. That causes corresponding movement of the valve member 24 which is thus moved in opening direction, the extent of such movement depending upon the temperature of the cooling water.

It will be noted that both the valve member 24 and the thermostat bellows 14 are positioned at the same side of the valve seat member 10, being at the outer side thereof, that is, the side toward which the water travels in its flow through the passage 19 and defined by the element 12 of valve seat member 10. It will also be noted that the valve member 24 is connected to head 16 of the thermostat bellows 14 for movement with head 16, the latter being the movable head of the bellows and the inner head 17 of the bellows being stationary. Accordingly, the bellows head 16 and the valve member 24 move together and in the same direction. As the temperature of the water increases the expansion of the thermostat bellows increases and the valve member 24 is moved an increasing distance away from seat element 12 of the seat member 10, thus increasing the space through which the water can flow into the fitting 35. Accordingly, the space for free flow of the cooling water increases as required, and there is no obstruction to flow due to movement of the bellows head toward the valve seat member in the opening of the valve member, such as occurs in thermostats of the known type above referred to. By thus avoiding obstruction to flow of the water in the opening of the valve member, I assure that the water in the engine cooling system will have free flow when required. It will also be noted that by disposing the valve member and the thermostat bellows at the same side of the seat member, the thermostat bellows may be disposed upward within the water outlet fitting 35 of the engine block. Accordingly, that avoids the difficulties, previously mentioned, in respect to disposing the thermostat bellows downward in the top or head of the engine block, while avoiding all necessity for providing an adaptor or like member for mounting of the thermostat assembly, which can be quickly and easily secured in position by clamping the flange 11 between the engine block top 32 and the water outlet fitting 35, as shown in Figure 4.

In the modified form of cooling system control means embodying my invention, shown in Figure 5, the thermostat assembly 14 is mounted in a water inlet fitting or elbow 45 opening into the top tank 46 of a radiator 47 of known type. Valve seat member 10a is provided with an outer circumferential flange 11a from the outer edge of which extends a flange 11b fitting about the outer end of elbow 45, on which flange 11a seats. The end of hose 39 is secured about elbow 45 and flange 11b by a clamp 48 of known type. The thermostat valve assembly of Figure 5 is the same as that of Figures 1 to 4, inclusive, with the exception of the flange 11b of valve seat member 10a extending from flange 11a about elbow 45. It will be clear, from what has been said, that the valve assembly of Figure 5 functions in the same manner as that of Figure 4, the only difference being that in Figure 5 the valve assembly is positioned adjacent the radiator, which may be desirable in certain cases, whereas in Figure 4 the valve assembly is disposed in proximity to the engine block.

In practice, the tubular valve stem 18 is of sufficient capacity to contain a substantial portion of the thermosensitive fluid with which the bellows 14 is charged, when such fluid is condensed into liquid. In the event of air becoming trapped within the housing 23, as may happen occasionally, the stem 18 remains immersed in the engine coolant or water and the thermostat bellows, therefore, will still respond promptly to variations in cooling water temperature. That is desirable as guarding against sluggish operation of the thermostat due to trapping of air in housing 23.

It will be understood that changes in detail may be made without departing from the field and scope of my invention, and I intend to include all such variations, as fall within the scope of the appended claims, in this application in which the preferred forms only of my invention have been disclosed.

I claim:

1. In thermostatic control means for engine cooling systems, an engine block having a cooling water space with an outlet opening, an outlet fitting on said block, a stationary valve seat member between said block and fitting defining a passage therebetween, a thermostat bellows in said fitting at the outlet side of said passage comprising a corrugated body closed at its inner end by an imperforate inner stationary head and at its outer end by an outer movable head attached to and movable with the outer end of said body, and a housing attached to said movable head extending therefrom inwardly along said bellows body exteriorly thereof and beyond said inner head and provided at its inner end with a valve member cooperating with said valve seat member and movable toward and away from the latter independently of said inner head, said valve member being open for entry into said housing of water from the inner side of said seat member and said housing having a restricted opening for escape of water therefrom and being otherwise closed.

2. In thermostatic valve means for controlling the flow of cooling liquid for an internal combustion engine, a valve seat member defining a passage having an inlet side and an outlet side for flow of liquid therethrough, an anchor member fixed to said seat member spaced from the inlet side thereof and extending across said passage, a thermostat bellows at the outlet side of said seat member comprising a corrugated body having an inner head and an outer head secured to and closing the end of said body, a stem of less diameter than said passage extending therethrough and secured at its ends to said anchor member and said inner head respectively restraining the latter against movement relative to said seat member, a housing attached to and movable with said outer head extending therefrom inwardly along said body exteriorly thereof and beyond said inner head, and a valve member cooperating with said seat member and attached to the inner end of said housing for movement therewith toward and away from said seat member, said stem extending through said valve member with clearance therebetween for entry of water into said housing and the latter having a restricted outlet opening and being otherwise closed.

3. In thermostatic valve means for controlling the flow of cooling liquid for an internal combustion engine, a valve seat member defining a passage for flow of liquid therethrough, an anchor member fixed to said seat member spaced from one side thereof and extending across said passage, a thermostat bellows at the other side of said seat member comprising an inner head and an outer head, a stem of less diameter than said passage extending therethrough and secured at its ends to said anchor member and said inner head respectively restraining the latter against movement relative to said seat member, a housing attached to said outer head extending therefrom inwardly along said bellows exteriorly thereof, and a valve member secured to the inner end of said housing cooperating with said seat member and having an opening about said stem providing clearance thereabout for entry of liquid into said housing, the latter having a restricted opening in its wall adjacent said outer head for escape of fluid therefrom, said housing being otherwise closed.

4. In thermostatic control means for engine cooling systems, means providing a passage through which cooling water flows in one direction, a stationary valve seat member in said passage defining an opening for flow therethrough of the cooling water, a thermostat bellows at the outlet side of said opening comprising a corrugated body closed at its inner end by a stationary head and at its outer end by an outer head attached to and movable with the outer end of said body, a housing attached to said outer head movable thereby toward and away from said valve seat member, said housing extending inwardly along said body exteriorly thereof and beyond said inner head, and a valve member attached to the inner end of said housing spaced inwardly from said inner head and cooperating with said valve seat member, said valve member having a restricted opening into said housing and the latter having a restricted outlet opening adjacent said outer head and being otherwise closed.

5. In thermostatic valve means for controlling the flow of cooling liquid for an internal combustion engine, a valve seat member defining a liquid flow passage having an inlet side and an outlet side, a thermostat bellows at the outlet side of said seat member comprising a corrugated body, an outer head secured to and closing the outer end of said body and movable thereby toward and away from said valve seat member, an inner head secured to and closing the inner end of said body, a stem of less diameter than said passage extending therethrough and secured to said seat member and said inner head restraining the latter against movement relative to said seat member, a housing carried by said outer head movable therewith toward and away from said seat member, said housing extending inwardly along said bellows body exteriorly thereof and beyond said inner head, and a valve member carried by said housing at the inner end thereof spaced inwardly from said inner head and cooperating with said valve seat member, said valve member being slidable on said stem with clearance therebetween for entry of liquid into said housing and the latter having a restricted outlet opening and being otherwise closed.

6. In thermostatic valve means for controlling the flow of cooling liquid for an internal combustion engine, a valve seat member defining a liquid flow passage having an inlet side and an outlet side, a thermostat bellows at the outlet side of said seat member having an outer head movable toward and away from said seat member and an inner stationary head, a housing carried by said outer head movable thereby toward and away from seat member, said housing extending inwardly along said bellows exteriorly thereof and beyond said inner head, and a valve member carried by said housing at the inner end thereof spaced inward from said inner head and cooperating with said seat member, said valve member having a restricted inlet opening for admitting liquid to said housing and the latter having a restricted outlet opening cooperating with said inlet opening for permitting flow of liquid through said housing and about said thermostat, said housing being otherwise closed.

RALPH T. MARETTE.

REFERENCES CITED

The following references are of record in the file of this patent:

UNITED STATES PATENTS

| Number | Name | Date |
|---|---|---|
| 1,784,061 | Giesler | Dec. 9, 1930 |
| 2,032,069 | Radford | Feb. 25, 1936 |
| 2,060,332 | Mayo | Nov. 10, 1936 |
| 2,157,770 | Mayo | May 9, 1939 |

FOREIGN PATENTS

| Number | Country | Date |
|---|---|---|
| 656,867 | France | Jan. 7, 1929 |